Feb. 19, 1935.  R. F. WEDGE  1,991,478
PLANT PACKAGE IN BOX
Filed July 29, 1931
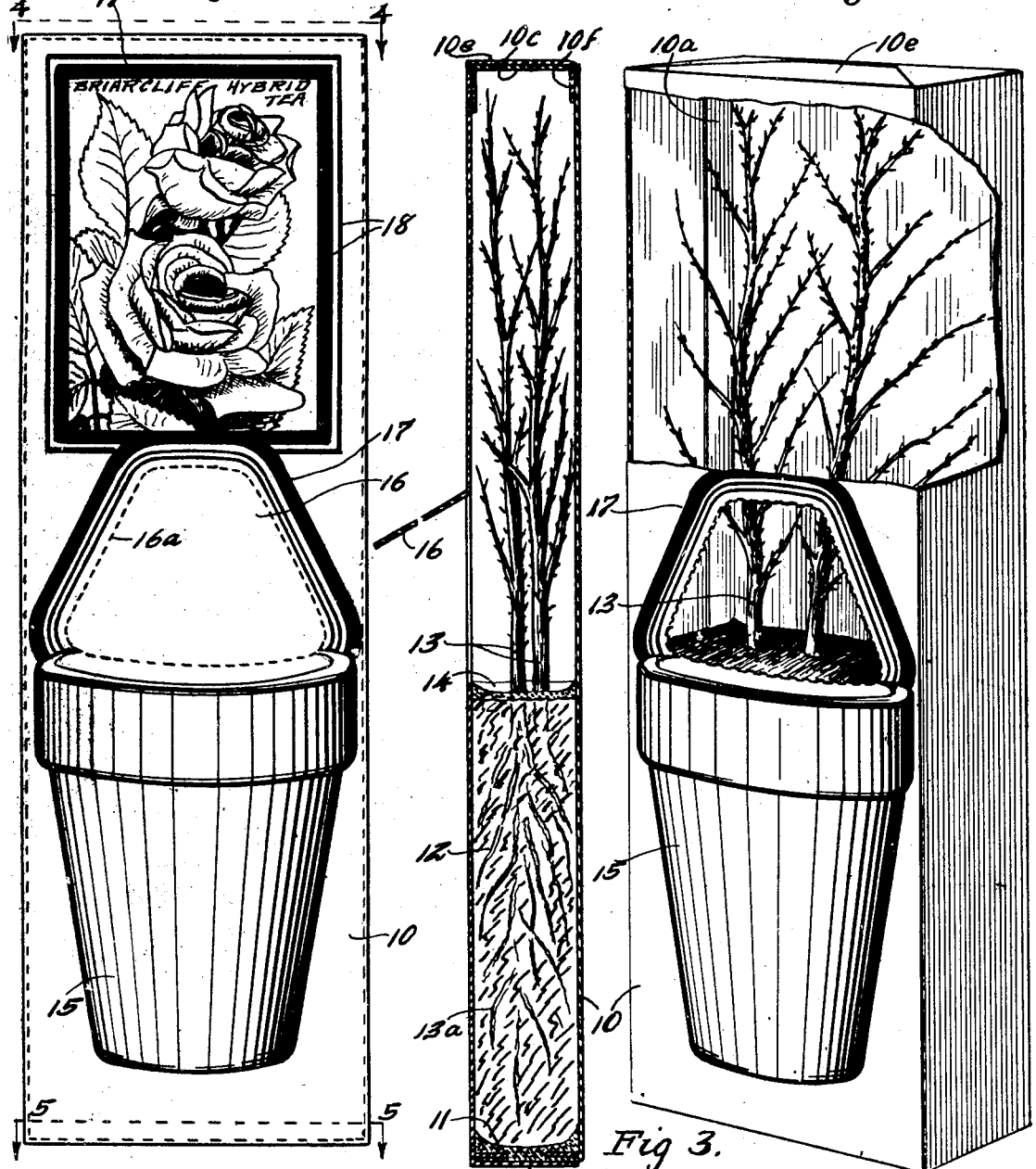
INVENTOR
RALPH F. WEDGE
BY
ATTORNEY Patented Feb. 19, 1935

1,991,478

UNITED STATES PATENT OFFICE 1,991,478

PLANT PACKAGE IN BOX

Ralph F. Wedge, Albert Lea, Minn.

Application July 29, 1931, Serial No. 553,731

13 Claims. (Cl. 206—46)

This invention relates to a plant package, and particularly to such a package in which a plant is put up to be transported and sold. It is desirable to have a plant package in which the plant can be transported, protected and displayed in the store in which it is sold. A large number of plants of different kinds are now sold in many stores, such as department stores, hardware stores, grocery stores and others. It is desirable not only to have a package which is convenient to transport and handle, but also one in which the condition of the plant can be inspected.

It is an object of this invention, therefore, to provide a plant package comprising a container made of stiff sheet material having therein a quantity of plant sustaining material in which the roots of the plant are disposed, the plant extending upward into said container, said container having a removable section in the wall thereof adapted to be removed to form an opening through which the condition of the plant may be observed.

It is another object of the invention to provide a plant package comprising a container of stiff sheet material having a body of plant sustaining material in the bottom thereof, a plant having its roots disposed in said material extending upwardly into said container, said container having on one side thereof the representation of a flower pot, the top of which is slightly above the top of said material, said side having a section removable along the top of the pot so that the material appears to be contained in said pot.

It is still another object of the invention to provide a plant package comprising a container of stiff sheet material having a quantity of plant sustaining material in the bottom thereof, a plant having its roots disposed in said material and extending upwardly into said container, said container having on its side and at the upper portion thereof a picture of the flower or fruit of said plant.

It is a further object of the invention to provide a plant package formed of stiff sheet material with a bottom formed of overlapping flaps, the upper ones of which have openings therethrough, a quantity of adhesive waterproof material disposed in said bottom connecting and sealing said flaps and forming a waterproof bottom for said box, a quantity of plant sustaining material disposed above said waterproof material, and a plant having its roots disposed in said material and extending upwardly into said box.

It is also an object of the invention to provide a plant package such as set forth in the preceding paragraph, in which a layer of waterproof substance is disposed over said material and extends between the walls of said box surrounding the stem or stems of said plant.

It is still further an object of the invention to provide a plant package comprising a box formed of stiff sheet material, a body of plant sustaining material disposed in the lower portion of said box, a plant having its roots disposed in said material and extending upwardly into said box, the outer side of said box having at its bottom the representation of a flower pot thereon, a perforated removable section above said flower pot, and a picture of a flower or fruit of said plant above said perforated section.

These and other objects and advantages of the invention will be fully set forth in the following description made in connection with the accompanying drawing, in which like reference characters refer to similar parts throughout the several views, and in which:—

Fig. 1 is a view in front elevation of the package;

Fig. 2 is a central vertical section through the package taken at right angles to the plane of Fig. 1;

Fig. 3 is a perspective view of the package, certain parts being broken away;

Fig. 4 is a top plan view as indicated by line 4—4 of Fig. 1; and

Fig. 5 is a horizontal section taken on line 5—5 of Fig. 1 as indicated by the arrows.

Referring to the drawing, a package is shown comprising a container or box 10. While this box may be made of various shapes and materials, in the embodiment of the invention illustrated it is shown as of rectangular shape in horizontal and vertical cross section and formed of stiff sheet material such as cardboard. The box 10 is folded from a sheet and has an inner flap 10a overlapping one side thereof, said flap 10a being permanently secured to said side by suitable adhesive. The top of the box is formed by flaps 10b at the sides thereof which are folded inwardly, a flap 10c which is folded from the rear side inwardly and downwardly to overlie the flaps 10b and having a slit or slot 10d adjacent its rear side, said flap 10c being bent at right angles to extend downwardly a short distance along the front inner side of said box, and a flap 10e folded downwardly from the front and having a bill portion or extension 10f bent at right angles and extending downwardly through the slot 10d and disposed against the rear side of said box. The bottom of said box is formed by flaps 10g extending inwardly from the ends of the box, the flap 10h extending inwardly from the rear of the box and the bottom flap 10i extending rearwardly from the front of the box. The flap 10h is provided with a number of holes or perforations 10j and the flaps 10g are also provided with holes or perforations 10k which are slightly larger than the openings 10j which they overlie. A quantity of waterproof adhesive substance 11 is placed in the bottom of the container or box, this material preferably being such a substance as pitch or asphaltum which is adapted to harden or set into a semi-hard state. The substance 11 passes through the openings 10j and 10k, the same connecting and sealing the flaps 10g, 10h and 10i together and extending between the walls of the container to form a waterproof bottom therefor. A quantity of plant sustaining material 12 is placed in the container above the substance 11, which material may be loam or a mixture of peat and loam. Peat is preferably used, as it contains and retains a considerable amount of the moisture for use by the plant. A plant 13 is contained in the box 10, having its roots 13a disposed in the material 12 and having its stem and twigs extending upwardly into the upper portion of said box or container. A layer of waterproof substance 14 similar to the substance 11 is placed over the material 12, the same extending to and adhering to the sides of the container and closely surrounding the stem of the plant 13. The portion of the plant extending above the substance 14 preferably is coated with a thin coat of semi-waterproof substance adapted to harden, such as paraffin. The plant can be thus coated by quickly dipping the same into a solution of melted paraffin. This coats the stem and twigs and causes no injury to the plant when the same is in dormant condition.

The container 10 has on its front portion at the lower side thereof a representation 15 of a flower pot. The front side of the container is provided with a removable section 16 perforated along a line 16a, the lower portion of which extends approximately along the top or substantially coincident with the line forming the top of the representation 15 of the flower pot. The removable section 16 is substantially of trapezoidal shape with rounded corners and the container is illustrated as having a border 17 formed thereabout. Another border 18 formed of a heavy line and a lighter line spaced therefrom, is provided above the border 17 and illustrated as defining a rectangle. Within the border 18 is a picture or representation of a flower or fruit of the plant 13. A legend 19 is placed on the package, giving the name of the plant.

In the use of the package, the same is formed as shown and described, and the package can be transported and displayed in the stores in which the same is sold. The name of the plant can be readily seen by the customer and the flower or fruit produced by the plant can be seen in the picture within border 18. The salesman can loosen the section 16 at the sides and bottom thereof along the perforated line 16a and the customer can then see the stem and some of the twigs of the plant, and can see that it is alive and in growing condition. In the spring of the year, when the plants are usually sold, the stem and twig will have some buds thereon and may have some green shoots indicating the condition of the plant. The substance 11 in the bottom of the box insures that any moisture in the material 12 will not pass to and soften the bottom of the box. A waterproof bottom is also provided so that the bottom of the box will not become softened so as to be liable to break and spill the material 12 should the packages be placed in a damp location. The substance 14 prevents evaporation of the moisture from the material 12 so that a supply of moisture for the plant is retained in the package for a long period. The upper portion of the plant being coated with paraffin, evaporation of the moisture of the plant through the stem and twigs is prevented. The paraffin does not interfere with the growth of the plant and the green shoots or buds readily burst through the paraffin.

From the above description it is seen that applicant has provided a simple, inexpensive and highly efficient plant package. The package can be easily shipped and transported commercially, and is quite convenient for the customer or purchaser to carry. The plant is kept in perfect condition in the package and has access to moisture and food. As stated, the condition of the plant can be easily inspected by the purchaser. The package is quite ornamental and is designed to give the impression of a pot with a growing plant therein. The representations in the pot and the bloom are, of course, nicely colored on the package, so that a very realistic picture is produced. The device has been amply demonstrated in actual practice and found to be very successful and efficient, and the same is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A plant package comprising a box formed of stiff sheet material, a body of plant sustaining material disposed directly in the bottom of said box, said box having overlapping flaps at its bottom, the flaps above the bottom flap having holes therethrough, a waterproof adhesive disposed over said flaps beneath said material and extending through said holes to connect said flaps and seal the bottom of the box, whereby said bottom is kept dry and a waterproof bottom provided and a live plant disposed in said box with its roots in said material and extending upwardly in said box.

2. A plant package comprising a box formed of stiff sheet material, a body of plant sustaining material disposed in the bottom of said box, said box having a bottom formed of overlapping flaps, a waterproof substance beneath said material engaging and connecting said flaps and sealing the bottom of said box to form a waterproof bottom therefor and a plant having its roots disposed in said material and extending upwardly in said box.

3. A plant package for sustaining and protecting a live but substantially dormant plant on its journey from the nursery to the purchaser from a dealer for replanting, comprising a container formed of stiff sheet material completely housing said plant, a body of plant sustaining material disposed in the bottom of said container, the walls of said container constituting the sole stiff or rigid means confining said plant sustaining material, a live but substantially dormant plant having its roots embedded in said plant sustaining material and extending upwardly in said container within the walls thereof, and a waterproof covering for said plant sustaining material through which the stem or trunk of said plant extends.

4. A plant package for sustaining and protecting a live but substantially dormant plant on its journey from the nursery to the purchaser from a dealer for replanting, comprising a container formed of stiff sheet material completely housing said plant, a body of plant sustaining material disposed in the bottom of said container, a live but substantially dormant plant having its roots embedded in said material and extending upwardly in said container within the walls thereof, a seal for said plant sustaining material with a portion extending over the top thereof through which the trunk of said plant extends, said container having means in its wall above said plant sustaining material through which the plant may be visually inspected, and having on its exterior a representation of the flower or fruit of said plant.

5. A plant package for sustaining and protecting a live but substantially dormant plant on its journey from the nursery to the purchaser from a dealer for replanting, comprising a container formed of stiff sheet material completely housing said plant having bottom, top and side walls, a body of plant sustaining material in the bottom portion of said container and conformed to the shape of said container, a live but substantially dormant plant having its roots embedded in said plant sustaining material and extending upwardly in said container within the walls thereof, the wall of said container above said plant sustaining material having means therein facilitating a visual inspection of said plant and said walls having thereon a representation of the flower or fruit of said plant.

6. The structure set forth in claim 5, said last mentioned means comprising a zone of said wall defined by perforations to form a flap which may be entirely or partially removed.

7. A plant package for sustaining and protecting a live but substantially dormant plant on its journey from the nursery to the purchaser from a dealer for replanting, comprising a container formed of stiff sheet material completely housing said plant, a body of plant sustaining material in the bottom of said container, a pictorial representation of a flower pot on a portion of said container opposed to said plant sustaining material, means for viewing said plant above said representation, and a pictorial representation of the bloom or fruit of said plant in maturity above said pictorial representation.

8. A package containing a shrub-like plant and its roots and comprising a container of comparatively stiff sheet material having plant sustaining material disposed in the bottom thereof in which the roots of said plant are embedded, said plant extending upwardly in said container, said container having means above said plant sustaining material for viewing said plant, and also having on its exterior a pictorial representation of the matured fruit or bloom of said plant, whereby a suggestive effect is given of the plant being seen in bloom or fruit bearing condition.

9. A package containing a shrub-like plant and its roots and comprising a container of stiff sheet material with moisture containing dirt in the bottom thereof, said roots being embedded in growing condition in said dirt and said plant extending upwardly in said container, said container having means for viewing said plant above the dirt, and a pictorial representation of the mature bloom of said plant above said means, whereby a suggestive effect is given of the plant being in bloom.

10. A plant package for sustaining and protecting a live but substantially dormant plant on its journey from the nursery to a purchaser from the dealer for replanting comprising a container formed of stiff sheet material capable of maintaining a definite shape, a body of plant-sustaining material in the bottom of said container, the roots of the plant being embedded in said last mentioned material and the plant extending upwardly in said container above said last mentioned material and being completely housed in said container, said container having means for viewing said plant above said last mentioned material and a pictorial representation of the fruit or bloom of said plant in maturity on the outside of said container and at the upper portion thereof.

11. A plant package for sustaining and protecting a live but substantially dormant plant on its journel from the nursery to the purchaser from a dealer for replanting, comprising an elongated container formed of stiff sheet material and of general rectangular form in horizontal and vertical cross section, a live but substantially dormant plant in said container, said container completely enclosing and housing said plant, a body of plant-sustaining material in the bottom portion of said container embedding the roots of said plant, a pictorial representation of the bloom or fruit of said plant on the exterior of said container, said container having means above said plant-sustaining material whereby the plant can be seen and examined as to its condition.

12. A plant package for sustaining and protecting a live but dormant plant on its journey from the nursery to the purchaser from a dealer for replanting comprising, a container formed of stiff sheet material of general rectangular form in horizontal and vertical cross section, a live but dormant plant in said container, said container completely enclosing and housing said plant, a body of plant-sustaining material in the body of said container embedding the root portion of said plant a waterproof covering over said plant-sustaining material and surrounding the stem of said plant, a pictorial representation of the bloom or fruit of said plant on the exterior of said container, said container having means above said plant-sustaining material by means of which the condition of the plant may be examined.

13. A plant package for sustaining and protecting a live but substantially dormant plant on its journey from the nursery to the purchaser from a dealer for replanting comprising a container formed of stiff sheet material, a body of solid plant sustaining material disposed in the bottom portion of said container which container constitutes the supporting means for the plant sustaining material, a live but substantially dormant plant having its roots embedded in said plant sustaining material and extending upwardly in said container within the walls thereof, said walls of said container extending about and completely surrounding the plant sustaining material and the upper portion of said plant, a waterproof covering for said plant sustaining material through which the stem or trunk of said plant extends, said container having in the walls thereof means facilitating an easy visual inspection of the condition of said plant.

RALPH F. WEDGE.